(12) United States Patent
Anbe

(10) Patent No.: US 8,768,415 B2
(45) Date of Patent: Jul. 1, 2014

(54) BASE STATION AND METHOD FOR DETECTING DISPLACEMENT OF BASE STATION

(71) Applicant: Fujitsu Limited, Kawasaki (JP)

(72) Inventor: Michiko Anbe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 95 days.

(21) Appl. No.: 13/681,969

(22) Filed: Nov. 20, 2012

(65) Prior Publication Data

US 2013/0196713 A1 Aug. 1, 2013

(30) Foreign Application Priority Data

Jan. 27, 2012 (JP) ................................. 2012-015481

(51) Int. Cl.
*H04W 24/00* (2009.01)
*H04B 1/38* (2006.01)

(52) U.S. Cl.
USPC ........................................ 455/561; 455/456.5

(58) Field of Classification Search
USPC ......... 455/561, 426.1, 456.1–456.6; 370/328, 370/338
See application file for complete search history.

(56) References Cited

U.S. PATENT DOCUMENTS

2008/0318596 A1* 12/2008 Tenny .................... 455/456.2
2009/0149194 A1* 6/2009 Howard .................. 455/456.1

FOREIGN PATENT DOCUMENTS

| JP | 2009-232286 | 10/2009 | |
| JP | 2010-28729 | 2/2010 | |
| JP | 2012054632 A * | 3/2012 | ............ H04W 16/16 |

* cited by examiner

*Primary Examiner* — Brandon Miller
(74) *Attorney, Agent, or Firm* — Myers Wolin, LLC

(57) ABSTRACT

A wireless base station includes a storage unit and a processor. The processor transmits to a first wireless terminal a first request for transmitting a first response including first identifiers used to identify a first base stations. The first wireless terminal is capable of receiving a signal from each of the first base stations. The processor receives the first response from the first wireless terminal. The processor stores the first response in the storage unit. The processor transmits to a second wireless terminal a second request for transmitting a second response including second identifiers used to identify second base stations. The second wireless terminal is capable of receiving a signal from each of the second base stations. The processor receives the second response from the second wireless terminal. The processor determines whether the wireless base station has been displaced based on the first identifiers and the second identifiers.

4 Claims, 11 Drawing Sheets

FIG. 3

| BASE STATION ID | RECEPTION QUALITY | RECEPTION COUNT |
|---|---|---|
| #a | 10 | 1 |
| #a | 9 | 2 |
| #a | 12 | 3 |
| #a | ... | ... |
| #b | 10 | 1 |
| #b | 5 | 2 |
| #b | 1 | 3 |
| #b | ... | ... |
| ... | ... | ... |

BASE STATION AND METHOD FOR DETECTING DISPLACEMENT OF BASE STATION

CROSS-REFERENCE TO RELATED APPLICATION

This application is based upon and claims the benefit of priority of the prior Japanese Patent Application No. 2012-015481, filed on Jan. 27, 2012, the entire contents of which are incorporated herein by reference.

FIELD

The embodiment discussed herein is related to a base station and a method for detecting displacement of a base station.

BACKGROUND

In a general wireless communication network such as cellular phone service, a number of base stations are installed so that communication is performed at any location. The base stations include an outdoor base station and a micro-mini base station. The outdoor base station covers a communication area (macrocell) of a radius of approximately several kilometers and is installed on a roof of a building or a steel tower. The micro-mini base station covers a communication area (femtocell) of a radius of approximately several tens of meters and is installed in a small office or an ordinary house. The outdoor base station is also referred to as a "macro base station". The micro-mini base station is also referred to as a "femto base station" (hereinafter also referred to as "femto"), a "femtocell base station", a "femtocell micro base station", or a "femtocell micro wireless base station".

Installation locations of base stations in a wireless communication network are determined so that optimum throughputs are obtained. Therefore, the base stations are assumed not to be displaced after once being installed. If the base stations are arbitrarily displaced, there may arise problems in that interference of radio waves is generated, throughputs are degraded, and connection is not established. Furthermore, in emergency situations, positional information which has been registered is to be transmitted to an emergency contact party such as a police station, a fire station, or the like. However, if the base stations are arbitrarily displaced, positional information transmitted to the emergency contact party does not match an actual location. The femto base stations are portable devices. However, in some areas, femto base stations are banned from being displaced pursuant to laws and regulations. For example, in Japan, displacement of a femto base station without permission may be punishable according to the Radio Act, the Electricity Business Act, or the like. Accordingly, a technique of managing installation locations of micro-mini base stations is demanded.

Therefore, the following system (System-1) has been proposed. A micro-mini base station receives, from a communication device such as a cellular phone positioned in a radio wave zone of the micro-mini base station, positional information obtained by the communication device from a GPS (global positioning system) satellite, and transmits the positional information to a management apparatus of the micro-mini base station.

Furthermore, the following system (System-2) has also been proposed. A portable micro base station which relays wireless communication of wireless communication terminals to a mobile communication network monitors states of radio waves from other base stations installed near the micro base station. In System-2, the micro base station which monitors the states of the radio waves of the other base stations installed near the micro base station detects changes in the states of the radio waves of the other base stations to detect changes in the positional relationships between the micro base station and the other base stations on the basis of the detected changes in the states of the radio waves. Then the micro base station estimates change of an installation location of the micro base station on the basis of the detected changes in the positional relationships.

Japanese Laid-open Patent Publication No. 2009-232286 and Japanese Laid-open Patent Publication No. 2010-28729 disclose related techniques.

System-1 is designed on the assumption that a wireless device such as a cellular phone existing in the radio wave zone of the micro-mini base station normally functions as a GPS receiver. Therefore, in System-1, if only wireless devices which have no function of receiving a signal from a GPS satellite exist in the radio wave zone, displacement of the micro-mini base station is not detected. In addition, if only wireless devices which do not normally function as a GPS receiver since the wireless devices exist in an environment in which the wireless devices are not allowed to obtain desired reception quality of a reception signal received from the GPS satellite exist in the radio wave zone, displacement of the micro-mini base station is not detected.

In System-2, there arises a problem in that, when the micro-mini base station detects radio waves of other base stations installed near the micro-mini base station, service of the micro-mini base station is stopped. Specifically, while the micro-mini base station detects the radio waves of the other base stations near the micro-mini base station, a process regarding wireless communication between the micro-mini base station and wireless devices such as cellular phones existing in the radio wave zone of the micro-mini base station is interrupted or stopped in the micro-mini base station.

SUMMARY

According to an aspect of the present invention, provided is a wireless base station including a storage unit and a processor. The processor transmits to a first wireless terminal a first request for transmitting a first response including first identifiers used to identify a first base stations. The first wireless terminal is capable of receiving a signal from each of the first base stations before transmitting the first response. The processor receives the first response from the first wireless terminal. The processor stores the first response in the storage unit. The processor transmits to a second wireless terminal a second request for transmitting a second response including second identifiers used to identify second base stations. The second wireless terminal is capable of receiving a signal from each of the second base stations before transmitting the second response. The processor receives the second response from the second wireless terminal. The processor determines whether the wireless base station has been displaced based on the first identifiers and the second identifiers.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating displacement information;

DESCRIPTION OF EMBODIMENT

Hereinafter, an embodiment will be described with reference to the accompanying drawings. A configuration of the embodiment is merely an example and a disclosed configuration is not limited to the concrete configuration of the disclosed embodiment. Any concrete configurations suitable for the embodiment may be employed to embody the disclosed configuration.

Embodiment

A femto base station of this embodiment obtains, from a wireless terminal connected to the femto base station, information regarding a reception state of a signal supplied to the wireless terminal from another base station installed near the femto base station so as to determine whether the femto base station is displaced.

Figure 1:
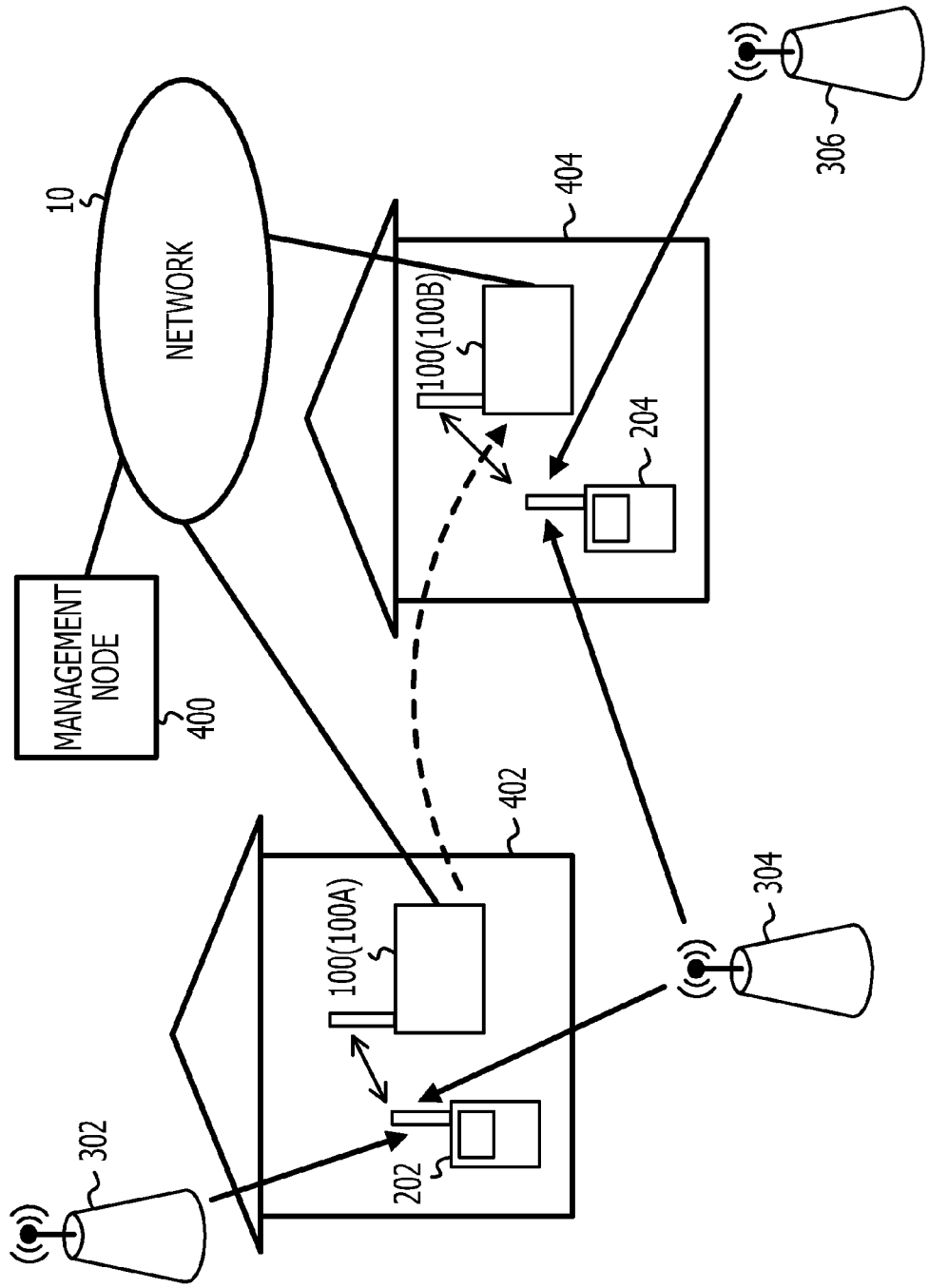
FIG. 1 is a diagram illustrating a configuration of a system.

FIG. 1 is a diagram illustrating a configuration of a system according to this embodiment. The system according to this embodiment illustrated in FIG. 1 includes a femto base station (micro-mini base station) 100, wireless terminals (UEs: user equipments) 202 and 204, macro base stations (outdoor base stations) 302, 304, and 306.

The wireless terminals 202 and 204 have the same configuration. Hereinafter, each of the wireless terminals 202 and 204 may be referred to as a wireless terminal 200 where appropriate. The wireless terminal 202 exists in a house 402 and the wireless terminal 204 exists in a house 404. When the femto base station 100 is located in the house 402, the femto base station 100 is referred to as a femto base station 100A where appropriate. When the femto base station 100 is located in the house 404, the femto base station 100 is referred to as a femto base station 100B where appropriate. The wireless terminal 202 is capable of receiving radio waves from the macro base stations 302 and 304. The wireless terminal 204 is capable of receiving radio waves from the macro base stations 304 and 306.

The femto base station 100A or the femto base station 100B is connected to a management node 400 through a network 10. The femto base station 100 may be installed in not only houses but also outdoor locations.

The macro base stations 302, 304, and 306 have the same configuration. Hereinafter, each of the macro base stations 302, 304, and 306 may be referred to as a macro base station 300 where appropriate.

The femto base station 100 of this embodiment detects displacement of the femto base station 100 from a position of the femto base station 100A to a position of the femto base station 100B on the basis of information received from the wireless terminal 200 which is wirelessly connected to (hereinafter simply referred to as "connected") the femto base station 100. The information is related to other base stations installed near the wireless terminal 200.

Figure 2:
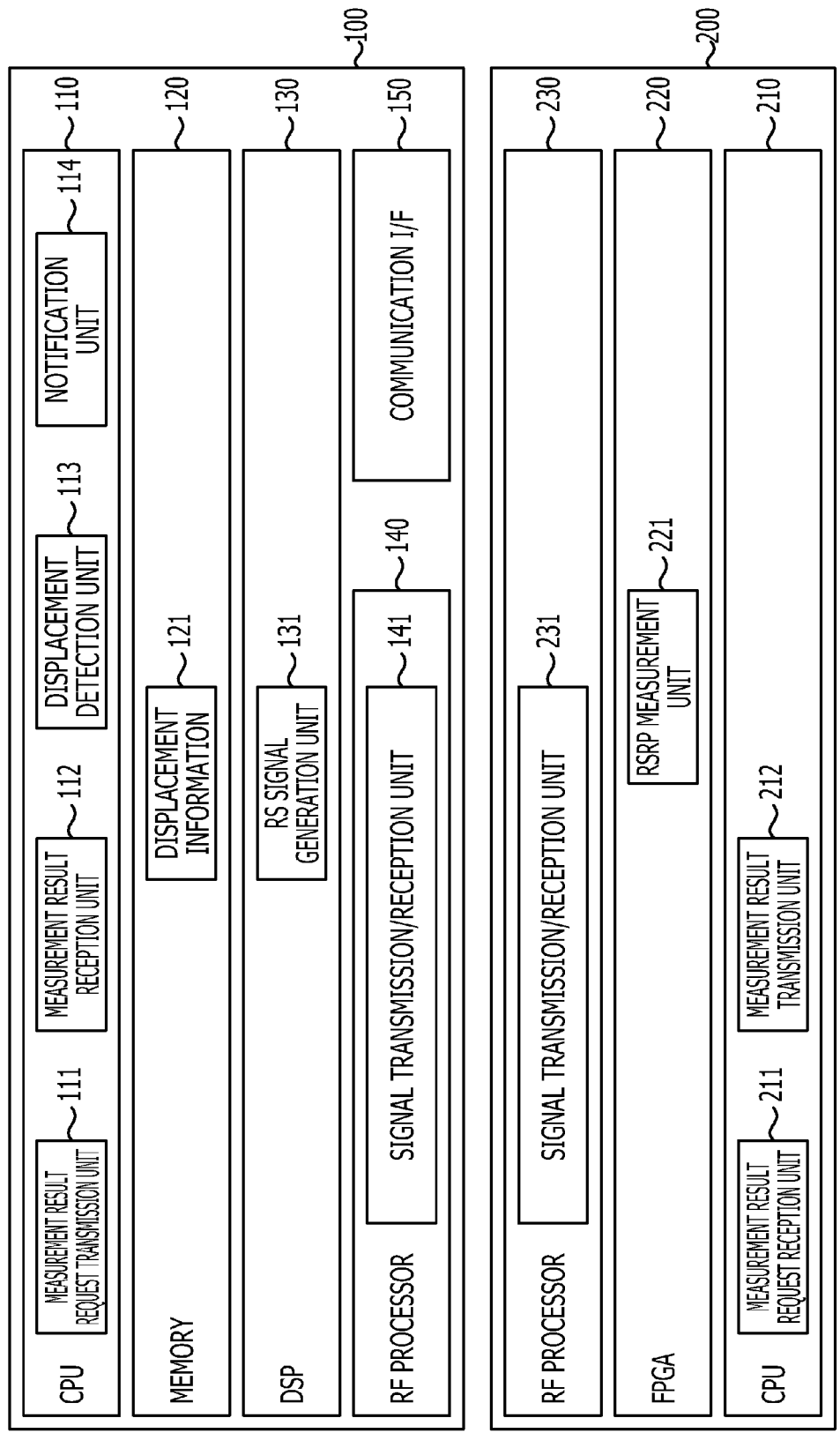
FIG. 2 is a diagram illustrating a configuration of a femto base station and a configuration of a wireless terminal.

FIG. 2 is a diagram illustrating a configuration of the femto base station 100 and a configuration of the wireless terminal 200. The femto base station 100 includes a CPU (central processing unit) 110, a memory 120, a DSP (digital signal processor) 130, an RF (radio frequency) processor 140, and a communication interface (I/F) 150.

The CPU 110 may function as a measurement result request transmission unit 111, a measurement result reception unit 112, a displacement detection unit 113, and a notification unit 114. The CPU 110 executes programs loaded into a work area of the memory 120 from a recording medium, not illustrated in FIG. 2, so as to control hardware resources included in the femto base station 100 or peripherals connected to the femto base station 100. By this, the CPU 110 realizes functions of the measurement result request transmission unit 111, the measurement result reception unit 112, the displacement detection unit 113, and the notification unit 114. The CPU 110 is an example of a processor.

The measurement result request transmission unit 111 requests the wireless terminal 200 to transmit a measurement result representing a reception state of a signal received from a base station. The measurement result request transmission unit 111 may request a transmission of a measurement report of a 3GPP (3rd Generation Partnership Project) as the measurement result. The measurement result request transmission unit 111 may request a transmission of other information representing a reception state of a signal received from a base station instead of the request for transmitting the measurement report.

The measurement result reception unit 112 receives a measurement result from the wireless terminal 200. The measurement result is a measurement report of the 3GPP, for example. The measurement result at least includes a base station identifier (ID) used to identify a macro base station 300 that transmits a signal which is receivable by the wireless terminal 200. The measurement result indicates from which macro base station 300 the wireless terminal 200 is capable of receiving a signal. The measurement result may include information on reception quality of a reception signal received from each macro base station 300. The measurement result may include information on reception quality of a reception signal received from the femto base station 100. Examples of the reception quality include an RSRP (Reference Signal Received Power).

The displacement detection unit 113 determines whether the femto base station 100 has been displaced on the basis of the measurement result received from the wireless terminal 200.

The notification unit 114 notifies the management node 400 of the displacement of the femto base station 100 through the network 10.

The memory 120 stores displacement information 121 therein. The memory 120 includes a RAM (random access memory) or a ROM (read-only memory). The memory 120 is an example of a storage unit. The memory 120 may store therein programs and various data to be used by the CPU 110 or the like.

The displacement information 121 includes a measurement result received from the wireless terminal 200. The displacement information 121 includes an identifier used to identify a macro base station 300 which has transmitted the signal received by the wireless terminal 200. Furthermore, the displacement information 121 may include information on reception quality of the received signal.

FIG. 3 is a diagram illustrating displacement information. In the example of FIG. 3, base station IDs, reception quality information, and the reception counts are stored as the displacement information 121 while being associated with one another. The displacement information 121 may include the date and time of the reception. Instead of the base station IDs, cell IDs which identify cells corresponding to the base stations may be used. Furthermore, the displacement information 121 may include cell IDs of cells of transmission sources of signals along with the base station IDs.

The DSP 130 is a processor which performs digital signal processing. The DSP 130 serves as an RS (reference signal) signal generation unit 131. The function of the DSP 130 may be realized by the CPU 110. Furthermore, the femto base station 100 may include two or more DSPs 130.

The RS signal generation unit 131 generates an RS signal. The RS signal is a reference signal. The RS signal may be referred to as a "pilot signal" or a "known signal" depending on a wireless communication standard. When the wireless terminal 200 or the like receives the RS signal and measures a reception power of the RS signal, reception quality in the wireless terminal 200 is estimated.

In the example of FIG. 2, an execution main body (CPU 110) which executes the measurement result request transmission unit 111, the measurement result reception unit 112, the displacement detection unit 113, and the notification unit 114 is different from an execution main body (DSP 130) which executes the RS signal generation unit 131. However, these units may be executed by the same processor. Furthermore, some of processes performed by the functional units including the measurement result request transmission unit 111, the measurement result reception unit 112, the displacement detection unit 113, the notification unit 114, and the RS signal generation unit 131 may be implemented by a circuit such as an FPGA (Field-Programmable Gate Array). Moreover, a circuit such as an FPGA which implements the processes of the functional units of the femto base station 100 of this embodiment and a processor such as a CPU or a DSP which executes programs to implement the processes of the functional units of the femto base station 100 of this embodiment may be mounted on the same chip.

The RF processor 140 includes an antenna, not illustrated in FIG. 2, a driving circuit for wireless signals which supplies power to the antenna, a reception circuit which processes wireless signals received from the antenna, and the like and realizes processing performed on wireless signals in wireless communication with the wireless terminal 200. A signal transmission/reception unit 141 illustrated in FIG. 2 functionally represents the processing performed on wireless signals realized by the RF processor 140, that is, a process of transmitting and receiving wireless signals between the femto base station 100 and the wireless terminal 200.

The communication interface 150 is used to connect the femto base station 100 to another apparatus through a network. The communication interface 150 is a LAN (local area network) interface board, for example.

The femto base station 100 may be realized by a dedicated or general computer such as a PC (personal computer) or a PDA (personal digital assistant) or an electronic apparatus incorporating a computer.

The wireless terminal 200 includes a CPU 210, an FPGA 220, and an RF processor 230. The wireless terminal 200 receives a measurement result request from the femto base station 100 and measures reception states of signals received from base stations. The wireless terminal 200 transmits the measured reception states as a measurement result to the femto base station 100. The measurement result at least includes identifiers (base station IDs) of the base stations which are transmission sources of the received signals. The wireless terminal 200 receives a signal (RS signal, for example) transmitted from each base station.

The CPU 210 may function as a measurement result request reception unit 211 and a measurement result transmission unit 212. The CPU 210 executes programs loaded into a work area of a memory, not illustrated in FIG. 2, from a recording medium, not illustrated in FIG. 2, so as to control hardware resources included in the wireless terminal 200 or peripherals connected to the wireless terminal 200. By this, the CPU 210 realizes functions of the measurement result request reception unit 211 and the measurement result transmission unit 212. The CPU 210 is an example of a processor.

The measurement result request reception unit 211 receives a measurement result request from the femto base station 100. Upon receiving the measurement result request from the femto base station 100, the measurement result request reception unit 211 causes an RSRP measurement unit 221 to measure reception states (reception quality) of signals received from base stations. The measurement result is a measurement report of the 3GPP, for example.

The measurement report of the 3GPP is transmitted as follows. First, the femto base station 100 transmits a request for measurement report to the wireless terminal 200, for example. The request for measurement report represents a request for transmitting a measurement report from the wireless terminal 200 to the femto base station 100. On the other hand, the wireless terminal 200 receives the request for measurement report. Furthermore, the wireless terminal 200 receives a reference signal (RS signal, for example) transmitted from each base station. The wireless terminal 200 measures reference signal reception power (RSRP) of each base station on the basis of the received reference signal. Then the wireless terminal 200 transmits a measurement report including base station IDs and the RSRPs of the base stations of the transmission sources of the respective RS signals to the femto base station 100. As a result, the femto base station 100 receives the measurement report from the wireless terminal 200. Thereafter, the femto base station 100 records the measurement report received from the wireless terminal 200.

The measurement result transmission unit 212 transmits the measurement result measured by the RSRP measurement unit 221 to the femto base station 100.

The FPGA 220 may function as the RSRP measurement unit 221. The FPGA 220 has a function of measuring reception quality of signals received from base stations.

The RSRP measurement unit 221 measures the reference signal reception power (RSRP) of the reference signal (RS signal) received from each base station. The wireless terminal 200 may measure index values representing another type of reception quality and transmit the index values to the femto base station 100. Furthermore, the wireless terminal 200 may include identifiers of the base stations of the transmission sources of the received signals (RS signals) in the measurement result.

In the example of FIG. 2, an execution main body (CPU 210) which executes the measurement result request reception unit 211 and the measurement result transmission unit 212 is different from an execution main body (FPGA 220) which executes the RSRP measurement unit 221. However, these units may be executed by the same processor. Furthermore, some of processes performed by the functional units including the measurement result request reception unit 211 and the measurement result transmission unit 212 may be implemented by a circuit such as an FPGA. Moreover, the circuit such as an FPGA which implements the processes of the functional units of the wireless terminal 200 of this embodiment and a processor such as a CPU which executes programs to implement the processes of the functional units of the wireless terminal 200 of this embodiment may be mounted on the same chip.

The RF processor 230 includes an antenna, not illustrated in FIG. 2, a driving circuit for wireless signals which supplies power to the antenna, a reception circuit which processes wireless signals received from the antenna, and the like and realizes processing performed on wireless signals in wireless communication with the macro base station 300. A signal transmission/reception unit 231 illustrated in FIG. 2 functionally represents the processing performed on wireless signals realized by the RF processor 230, that is, a process of transmitting and receiving wireless signals between the wireless terminal 200 and the femto base station 100 and between the wireless terminal 200 and the macro base station 300.

The wireless terminal 200 may be realized by a dedicated or general computer such as a smart phone, a cellular phone, or a car navigation device or an electronic apparatus incorporating a computer.

The macro base station 300 wirelessly communicates with the wireless terminal 200. The macro base station 300 is connected to a higher-level apparatus or the like through a network. The macro base station 300 is managed by the higher-level apparatus or the like. As with the case of the femto base station 100, the macro base station 300 may generate an RS signal and transmit the RS signal. The RS signal may be received by the wireless terminal 200.

The management node 400 manages the femto base station 100 through the network 10. Furthermore, the management node 400 may manage the macro base station 300. The management node 400 may receive a notification representing a detection of displacement of the femto base station 100.

Figure 11:
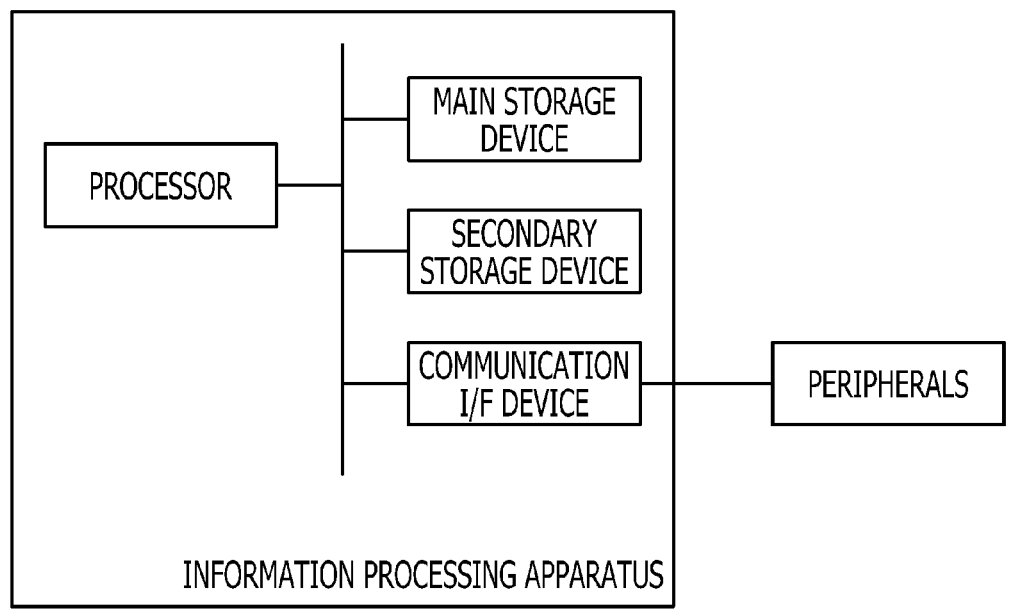
FIG. 11 is a diagram illustrating a configuration of an information processing apparatus.

FIG. 11 is a diagram illustrating a configuration of an information processing apparatus. A computer, that is, an information processing apparatus which realizes the femto base station 100 or the wireless terminal 200, includes a processor, a main storage device, a secondary storage device, and an interface device such as a communication interface device which interfaces with peripherals. The main storage device and the secondary storage device are computer-readable recording media.

The processor executes programs stored in the main storage device or loaded into a work area of the main storage device from a recording medium so as to control peripherals. By this, the computer realizes functions corresponding to predetermined objects.

The processor is a CPU or a DSP, for example. The main storage device includes a RAM or a ROM, for example.

The secondary storage device is an EPROM (erasable programmable ROM) or a hard disk drive (HDD), for example. Furthermore, the secondary storage device may include a removable medium, that is, a portable recording medium. Examples of the removable medium include a USB (universal serial bus) memory or a disk recording medium such as a CD (compact disk) or a DVD (digital versatile disk).

The communication interface device is a LAN interface board or a wireless communication circuit for wireless communication, for example.

The peripherals include, in addition to the secondary storage device and the communication interface device, an input device such as a keyboard and a pointing device and an output device such as a display device and a printer. The input device may include a device for inputting a video image or a still image such as a camera and a device for inputting audio, such as a microphone. The output device may include a device for outputting audio, such as a speaker.

Operation Example

Figure 4:
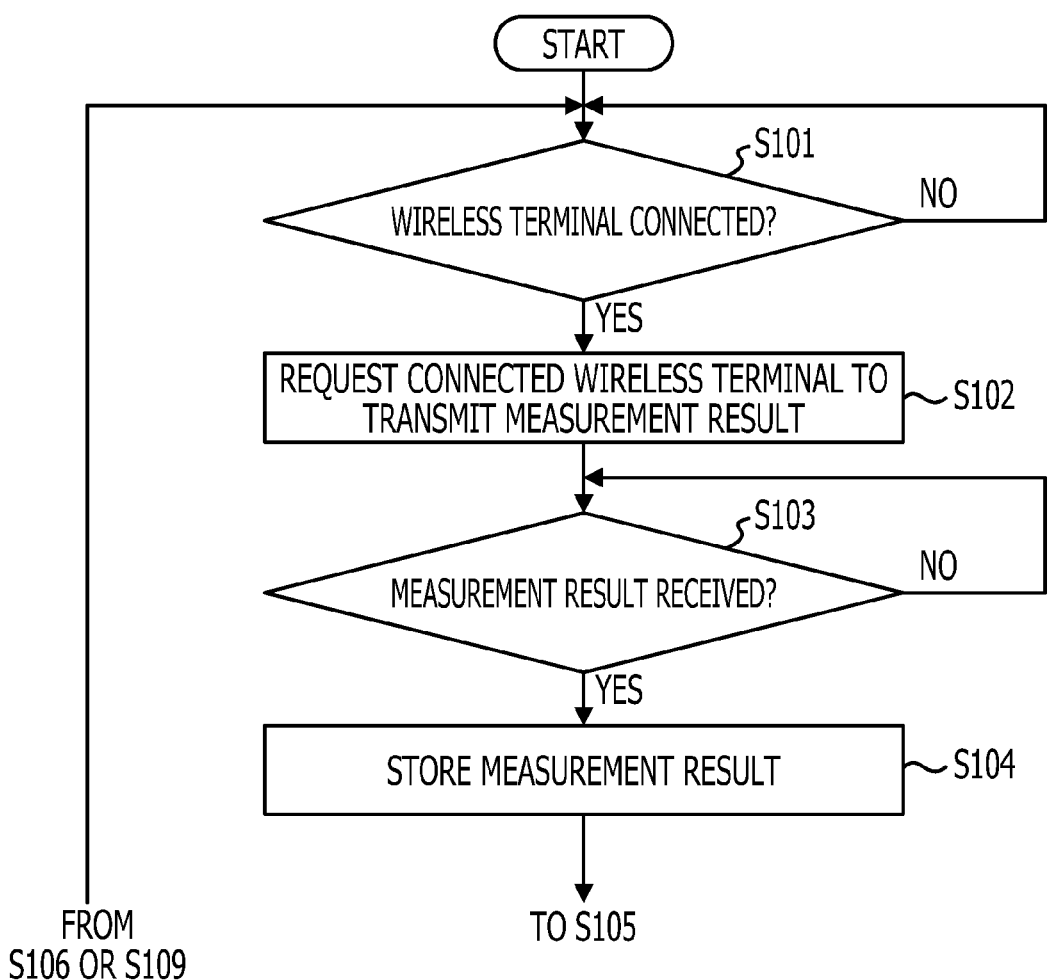
FIG. 4 is a flowchart illustrating an operation flow performed by a femto base station.
Figure 5:
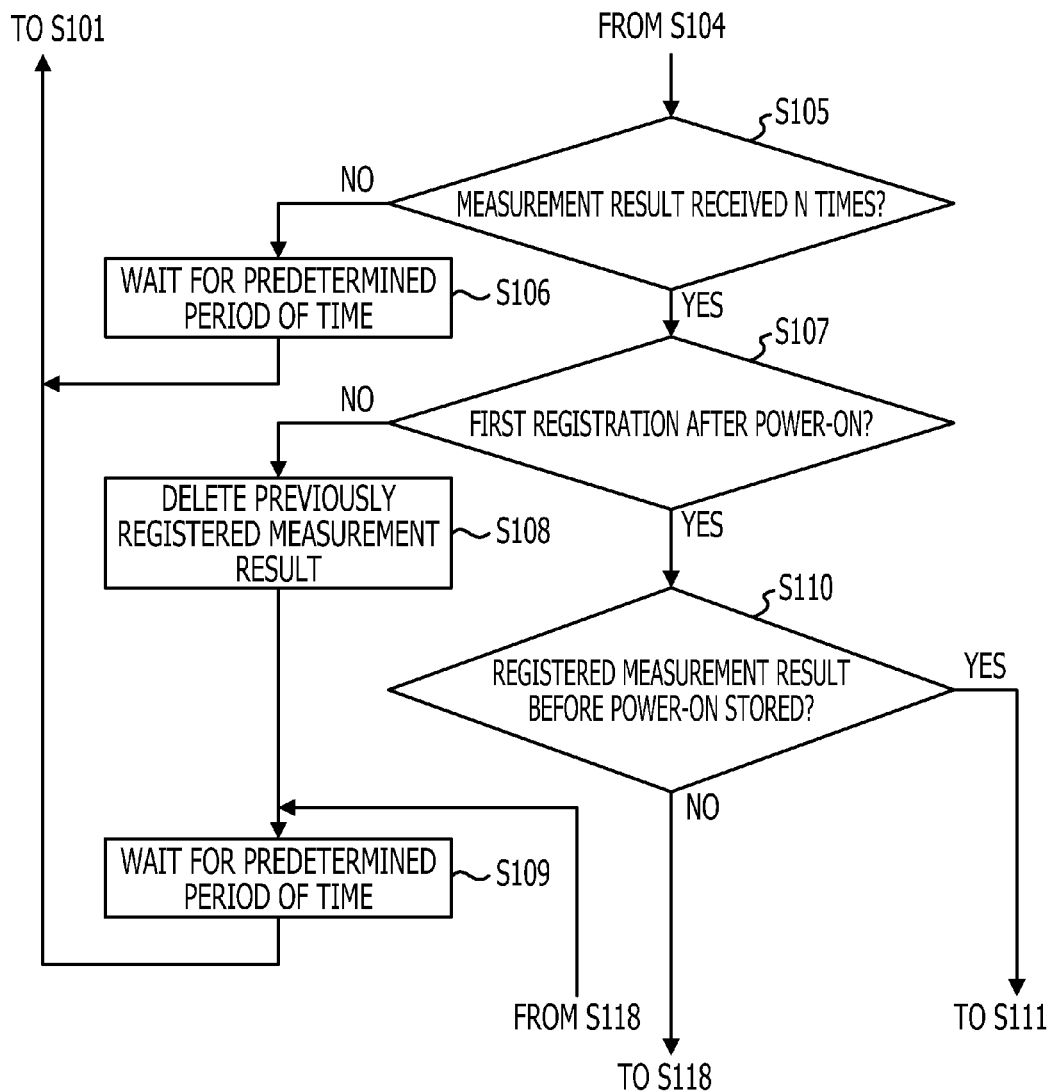
FIG. 5 is a flowchart illustrating an operation flow performed by a femto base station.
Figure 6:
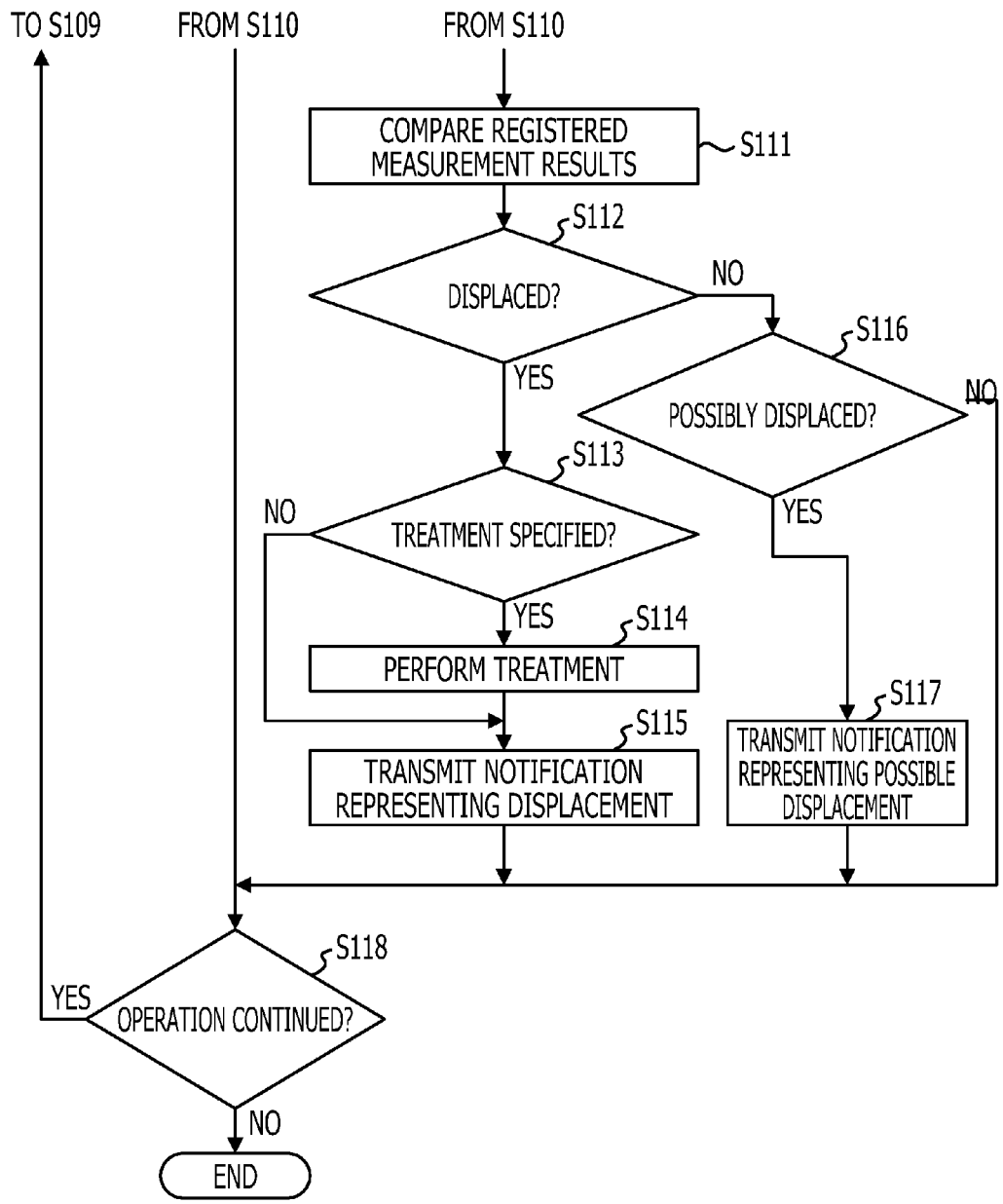
FIG. 6 is a flowchart illustrating an operation flow performed by a femto base station.

FIGS. 4 to 6 are flowcharts illustrating an operation flow performed by the femto base station 100. The operation flow illustrated in FIGS. 4 to 6 is started when the femto base station 100 is turned on. The operation flow illustrated in FIGS. 4 to 6 may be started in accordance with an instruction from a user.

The femto base station 100 determines whether the wireless terminal 200 is connected to the femto base station 100 (in S101). When the wireless terminal 200 is not connected to the femto base station 100 (S101: NO), the femto base station 100 waits until the wireless terminal 200 is connected to the femto base station 100. When the wireless terminal 200 is connected to the femto base station 100 (S101: YES), the process proceeds to S102.

The femto base station 100 requests the wireless terminal 200 connected to the femto base station 100 to transmit a measurement result (in S102). The measurement result is information representing reception states of signals received from base stations (the macro base station 300 and the femto base station 100) in the wireless terminal 200. The base stations are installed near the wireless terminal 200. The measurement result is a measurement report of the 3GPP, for example. When a plurality of wireless terminals 200 are connected to the femto base station 100, the femto base station 100 may request the individual wireless terminals 200 to transmit respective measurement results. The measurement results may include states of the base stations near the wireless terminals 200. A femtocell of the femto base station 100 is sufficiently smaller than a macrocell of the macro base station 300. It may be considered that, within the femtocell of the femto base station 100, base stations to which the wireless terminal 200 may be connected are not changed among the macro base station 300 and femto base stations other than the femto base station 100. Furthermore, it may be considered that variation of reception quality of the wireless terminal 200 is sufficiently small in one femtocell. Therefore, the measurement result of the wireless terminal 200 connected to the femto base station 100 may represent states of the base stations installed near the femto base station 100. Assuming that other base stations are not displaced, when the states of the base stations near the wireless terminal 200 are changed, it may be determined that the femto base station 100 is displaced.

The femto base station 100 determines whether a response (that is, the measurement result) to the request for transmitting the measurement result has been received from the wireless terminal 200 (in S103). When requesting a plurality of wireless terminals 200 to transmit the measurement result, the femto base station 100 determines whether measurement results have been received from the wireless terminals 200 which have received the request. When at least one of the wireless terminals 200 does not return the measurement result (S103: NO), the femto base station 100 waits until the measurement result has been received. When the measurement result has not been received by a predetermined time, the femto base station 100 may determine that the wireless terminal 200 has moved out of a range of the femtocell of the femto base station 100 and the process may be terminated.

When the measurement result has been received (S103: YES), the femto base station 100 adds one to the reception count of measurement results and the process proceeds to S104. The reception count of measurement results is stored in the memory 120. An initial value of the reception count of measurement results is 0.

Upon receiving the measurement result, the femto base station 100 stores the measurement result as the displacement information 121 in the memory 120 (in S104). The displacement information 121 may be stored in another storage device.

The femto base station 100 determines whether the measurement results have been received a predetermined number of times n from the wireless terminal 200 (in S105). An arbitrary number is set to the predetermined number of times n. The predetermined number of times n is 2, 4, or 8, for example. When the reception count (the number of receptions of the measurement results from the wireless terminal 200) is smaller than n (S105: NO), the femto base station 100 waits for a predetermined period of time (in S106) and the process returns to S101. The measurement result received from the wireless terminal 200 may be varied since the measurement result is affected by various environments. Therefore, the femto base station 100 requests for measurement results a predetermined number of times n and averages the received measurement results so as to obtain a more appropriate measurement result. The predetermined period of time in S106 is 100 ms or 300 ms, for example.

When the reception count of the measurement results is equal to n (S105: YES), the femto base station 100 resets the reception count of the measurement results to 0. When the measurement results include reception quality information, the femto base station 100 averages the reception quality information corresponding to the predetermined number of times n for each base station as an average of the measurement results. The femto base station 100 registers averages of the measurement results to the memory 120 or another storage device along with identifiers of respective source base stations of signals received by the wireless terminal 200. When the measurement results do not include the reception quality information, the femto base station 100 registers the identifiers of the source base stations of the signals received by the wireless terminal 200 as the measurement result in the memory 120 or another storage device. The measurement result or the average of the measurement results stored by the femto base station 100 is referred to as a "registered measurement result".

The femto base station 100 determines whether the registered measurement result registered in S105 is the first registration after the power-on (in S107). When the registered measurement result is not the first registration after the power-on (S107: NO), the femto base station 100 deletes the registered measurement result which has been previously registered in the memory 120 or the other storage device (in S108). The femto base station 100 stores the latest registered measurement result. When the femto base station 100 is turned off, the femto base station 100 stores the latest registered measurement result. Subsequently, the femto base station 100 waits for a predetermined period of time (in S109) and the process returns to S101. The predetermined period of time in S109 is longer than the predetermined period of time in S106. Frequent requests for measurement results may lead to increase of loads on the femto base station 100 and the wireless terminal 200. Furthermore, the states of the base stations installed near the wireless terminal 200 connected to the femto base station 100 are not frequently changed. Therefore, it is not preferable to frequently request measurement results. The predetermined period of time in S109 is one hour or one day, for example.

Returning to S107, when the registered measurement result is the first registration after the power-on (S107: YES), the femto base station 100 determines whether a registered measurement result which has been registered before the femto base station 100 is turned on has been stored in the memory 120 or the other storage device (in S110). When the registered measurement result which has been registered before the femto base station 100 is turned on has not been stored (S110: NO), the process proceeds to S118.

In S107, the femto base station 100 may proceed to S110 every predetermined period of time, for example, taking displacement of the femto base station 100 in a power-on state into consideration.

When the registered measurement result which has been registered before the power-on has been stored (S110: YES), the femto base station 100 compares the registered measurement result which has been registered before the power-on with the registered measurement result which is currently registered (in S111). A determination regarding displacement of the femto base station 100 will be described later. The femto base station 100 selects one of "displaced", "possibly displaced", and "not displaced" in S111. Note that the term "displaced" represents that it is determined that the femto base station 100 has been displaced. The term "not displaced" represents that it is determined that the femto base station 100 has not been displaced. The term "possibly displaced" represents that it is determined that the femto base station 100 has been possibly displaced.

Upon selecting "displaced" (S112: YES), the femto base station 100 determines whether a treatment to be performed when "displaced" is selected has been specified (in S113). Specification of the treatment is stored in the storage device or the memory, for example, in advance. When the treatment to be performed when "displaced" is selected has not been specified (S113: NO), the process proceeds to S115. When the treatment to be performed when "displaced" is selected has been specified (S113: YES), the femto base station 100 performs the treatment specified in advance (in S114). Examples of the specified treatment include: stopping transmission and reception of a wireless signal in the femto base station 100, turning off the femto base station 100, turning on an LED (light-emitting diode), performing display on a display device, and transmitting an e-mail. When such a treatment is performed, the user, administrator, or the like of the femto base station 100 may recognize that the femto base station 100 has been displaced. In S115, the femto base station 100 notifies the management node 400 of the displacement of the femto base station 100 and the process proceeds to S118.

Upon selecting "possibly displaced" (S112: NO and S116: YES), the femto base station 100 notifies the management node 400 of information representing that the femto base station 100 may be displaced (in S117) and the process proceeds to S118.

When the femto base station 100 selects "not displaced" (S112: NO and S116: NO), the process proceeds to S118.

In S118, the femto base station 100 determines whether the femto base station 100 is operating. When the femto base station 100 is operating (S118: YES), the process returns to S109. When the femto base station 100 is not operating (S118: NO), the femto base station 100 stops the operation of the femto base station 100 and the process of the operation flow is terminated.

Here, when the femto base station 100 is turned on again, a registered measurement result which has been registered before the power-on and a registered measurement result which is registered after the power-on are compared with each other. The femto base station 100 may make a determination of displacement by comparing a previous registered measurement result with the latest registered measurement result every predetermined period of time even if the femto base station 100 does not turned off and on.

The operations in the operation flow may be executed in a time-series manner, may be executed in parallel, or may be individually executed.

Comparison in S111

First Example

A first example of the comparison performed in S111 will be described. The femto base station 100 compares a registered measurement result which has been registered before the last power-on with a registered measurement result which is registered after the last power-on (a registered measurement result which is registered this time). Here, the femto base station 100 compares base station IDs included in the measurement results.

Figure 7:
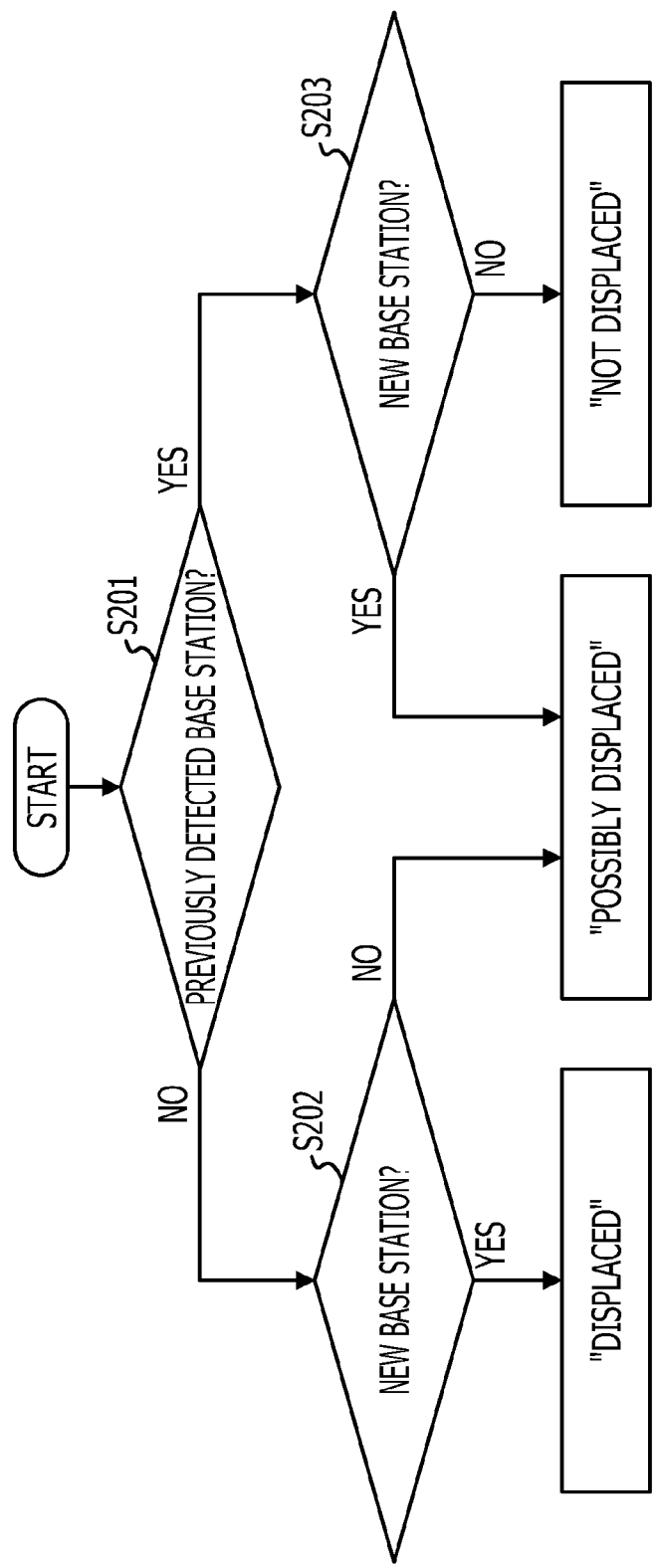
FIG. 7 is a flowchart illustrating an example of an operation flow for comparing registered measurement results in a femto base station.

FIG. 7 is a flowchart illustrating a first example of an operation flow for comparing registered measurement results in the femto base station 100.

The femto base station 100 extracts base station IDs from the registered measurement result which has been registered before the last power-on. The extracted base station IDs are referred to as a "previous base station ID group". The base station IDs included in the previous base station ID group include identifiers of source base stations of signals received by the wireless terminal 200 connected to the femto base station 100 before the last power-on (while in the previous power-on state). Furthermore, the femto base station 100 extracts base station IDs from the registered measurement result which is registered this time. The extracted base station IDs are referred to as a "current base station ID group". The base station IDs included in the current base station ID group include identifiers of source base stations of signals received by the wireless terminal 200 connected to the femto base station 100 after the last power-on.

The femto base station 100 determines whether there is at least one previously detected base station, that is, whether at least one base station ID included in the previous base station ID group is included in the current base station ID group (in S201). When there is no previously detected base station, that is, none of the base station IDs included in the previous base station ID group is included in the current base station ID group (S201: NO), the process proceeds to S202. In S202, the femto base station 100 determines whether there is a new base station, that is, at least one base station ID included in the current base station ID group is not included in the previous base station ID group. When there is at least one new base station, that is, at least one base station ID included in the current base station ID group is not included in the previous base station ID group (S202: YES), the femto base station 100 selects "displaced". The term "displaced" represents that a position of the femto base station 100 in the previous power-on state and a current position of the femto base station 100 are different from each other. When there is no new base station, that is, all of the base station IDs included in the current base station ID group are included in the previous base station ID group (S202: NO), the femto base station 100 selects "possibly displaced". The term "possibly displaced" represents that the position of the femto base station 100 in the previous power-on state and the current position of the femto base station 100 may be different from each other. Because, it is determined in S201 there is no previously detected base station, that is, none of the base station IDs included in the previous base station ID group is included in the current base station ID group.

When there is at least one previously detected base station, that is, at least one base station ID included in the previous base station ID group is included in the current base station ID group (S201: YES), the process proceeds to S203. In S203, the femto base station 100 determines whether there is at least one new base station, that is, whether at least one base station ID included in the current base station ID group is not included in the previous base station ID group. When there is at least one new base station, that is, at least one base station ID included in the current base station ID group is not included in the previous base station ID group (S203: YES), the femto base station 100 selects "possibly displaced". When there is no new base station, that is, all of the base station IDs included in the previous base station ID group are included in the current base station ID group (S203: NO), the femto base station 100 selects "not displaced". The term "not displaced" represents that the position of the femto base station 100 in the previous power-on state and the current position of the femto base station 100 are the same.

The femto base station 100 selects one of "displaced", "possibly displaced", and "not displaced" representing whether the femto base station 100 is displaced on the basis of the previous base station ID group and the current base station ID group.

The base station IDs in S201, S202, and S203 do not include the base station ID of the femto base station 100.

The femto base station 100 may select "displaced" instead of "possibly displaced".

Comparison in S111

Second Example

A second example of the comparison performed in S111 will be described. The femto base station 100 compares a registered measurement result which has been registered before the last power-on with a registered measurement result which is registered after the last power-on (a registered measurement result which is registered this time). Here, the femto base station 100 compares base station IDs and reception quality information included in the measurement results.

Figure 8:
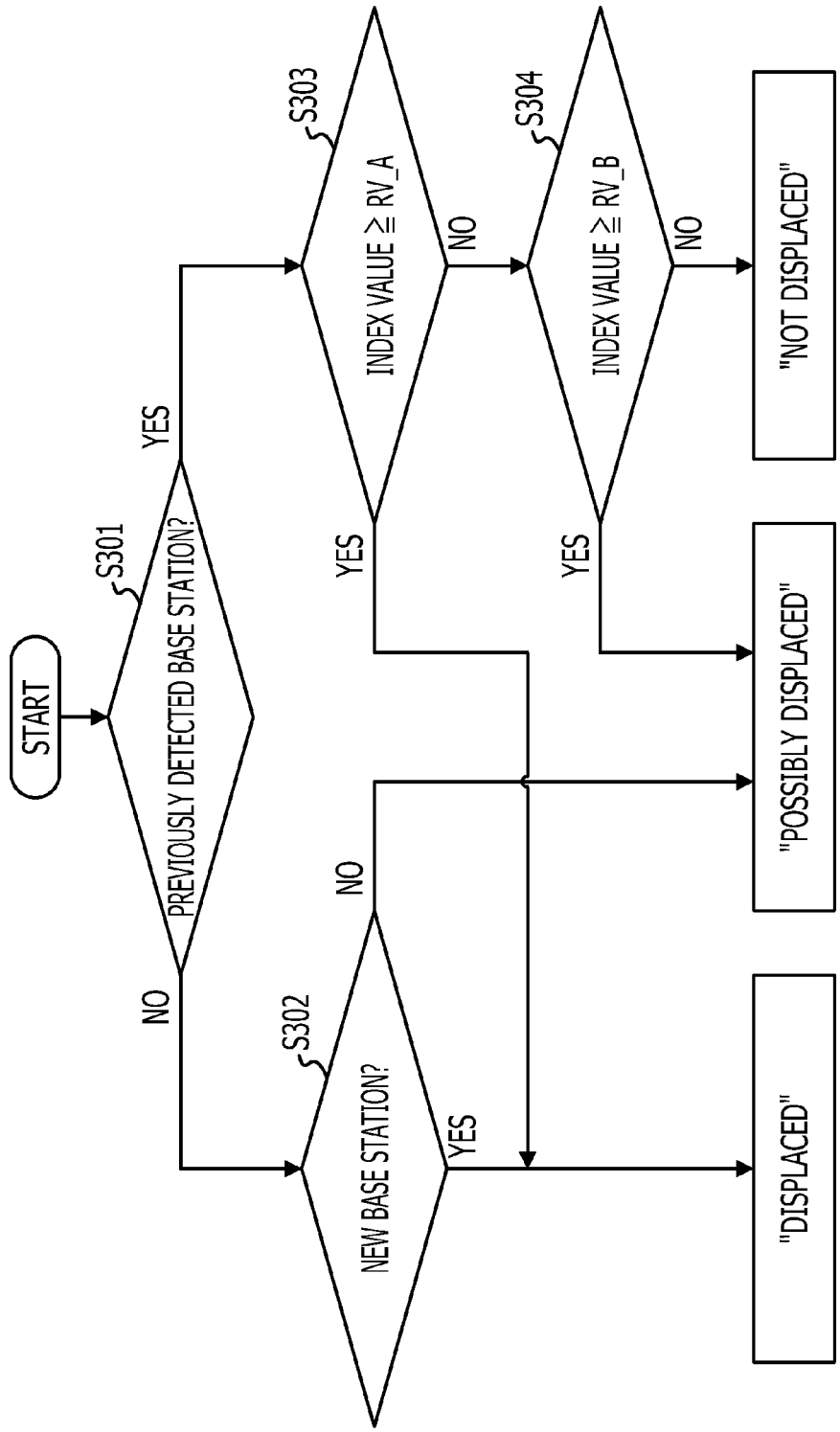
FIG. 8 is a flowchart illustrating an example of an operation flow for comparing registered measurement results in a femto base station.

FIG. 8 is a flowchart illustrating a second example of an operation flow for comparing registered measurement results in the femto base station 100.

As with the first example, the femto base station 100 extracts base station IDs from the registered measurement results and determines a previous base station ID group and a current base station ID group. Furthermore, the femto base station 100 extracts, for each base station ID, reception quality information of reception signals from the registered measurement results registered before power-on and the registered measurement results registered this time.

The femto base station 100 determines whether there is at least one previously detected base station, that is, whether at least one base station ID included in the previous base station ID group is included in the current base station ID group (in S301). When there is no previously detected base station, that is, none of the base station IDs included in the previous base station ID group is included in the current base station ID group (S301: NO), the process proceeds to S302. In S302, the femto base station 100 determines whether there is at least one new base station, that is, whether at least one base station ID included in the current base station ID group is not included in the previous base station ID group. When there is at least one new base station, that is, at least one base station ID included in the current base station ID group is not included in the previous base station ID group (S302: YES), the femto base station 100 selects "displaced". When there is no new base station, that is, all of the base station IDs included in the current base station ID group are included in the previous base station ID group (S302: NO), the femto base station 100 selects "possibly displaced".

When there is at least one previously detected base station, that is, at least one base station ID included in the previous base station ID group is included in the current base station ID group (S301: YES), the process proceeds to S303. In S303, the femto base station 100 extracts base station IDs included in both of the previous base station ID group and the current base station ID group. The femto base station 100 extracts reception quality information corresponding to the extracted base station IDs from the registered measurement results. The femto base station 100 calculates an index value on the basis of the extracted reception quality information. An example of the index value based on the reception quality information will be described later.

The femto base station 100 determines whether the obtained index value is equal to or larger than a predetermined value RV_A (in S303). When the obtained index value is equal to or larger than the predetermined value RV_A (S303: YES), the femto base station 100 selects "displaced". When the obtained index value is smaller than the predetermined value RV_A (S303: NO), the femto base station 100 determines whether the obtained index value is equal to or larger than a predetermined value RV_B (in S304). Note that, the predetermined value RV_B is smaller than the predetermined value RV_A. When the obtained index value is equal to or larger than the predetermined value RV_B (S304: YES), the femto base station 100 selects "possibly displaced". When the obtained index value is smaller than the predetermined value RV_B (S304: NO), the femto base station 100 selects "not displaced".

The base station IDs in S301 and S302 do not include the base station ID of the femto base station 100.

The femto base station 100 may select "displaced" instead of "possibly displaced".

Examples of the index value based on the reception quality information calculated by the femto base station 100 include the following. Here, the extracted base station IDs are included in both of the previous base station ID group and the current base station ID group. Examples of the reception quality information include RSRPs.

(1) A difference between an average value of reception quality information corresponding to base station IDs included in the previous base station ID group and an average value of reception quality information corresponding to base station IDs included in the current base station ID group.

(2) A difference between a difference between the maximum value and the minimum value of the reception quality information corresponding to the base station IDs included in the previous base station ID group and a difference between the maximum value and the minimum value of the reception quality information corresponding to the base station IDs included in the current base station ID group.

(3) A difference between an average value of differences between the reception quality information corresponding to the base station IDs included in the previous base station ID group and reception quality information of signals received from femto base station 100 and an average value of differences between the reception quality information corresponding to the base station IDs included in the current base station ID group and the reception quality information of the signals received from the femto base station 100.

(4) A difference between a difference between the maximum value and the minimum value of differences between the reception quality information corresponding to the base station IDs included in the previous base station ID group and the reception quality information of signals received from femto base station 100 and a difference between the maximum value and the minimum value of differences between the reception quality information corresponding to the base station IDs included in the current base station ID group and the reception quality information of the signals received from the femto base station 100.

The differences are represented by absolute values of differences.

When the index values are small (smaller than the predetermined value RV_B), the previous reception quality and the current reception quality are not different from each other. Therefore, when the index values are small (smaller than the predetermined value RV_B), it is considered that the femto base station 100 is not displaced.

On the other hand, when the index values are large (larger than the predetermined value RV_A), the previous reception quality and the current reception quality are different from each other by a predetermined level. Since the femtocell of the femto base station 100 is sufficiently smaller than the macrocell of the macro base station 300, variation of reception quality in the wireless terminal 200 is negligible in the femtocell of the femto base station 100 which has not been displaced. Therefore, when the current reception quality and the previous reception quality are different from each other by the predetermined level, it is considered that the femto base station 100 has been displaced.

The reception quality of the signals received from the femto base station 100 is reception quality of signals received by the wireless terminal 200 from the femto base station 100.

An index value other than those described above may be used. In a case where it is determined that the femto base station 100 has not been displaced when an index value is large, the operation flow of FIG. 8 is employed newly using an inverse number of the index value as the index value, for example.

Operation Sequence

Figure 9:
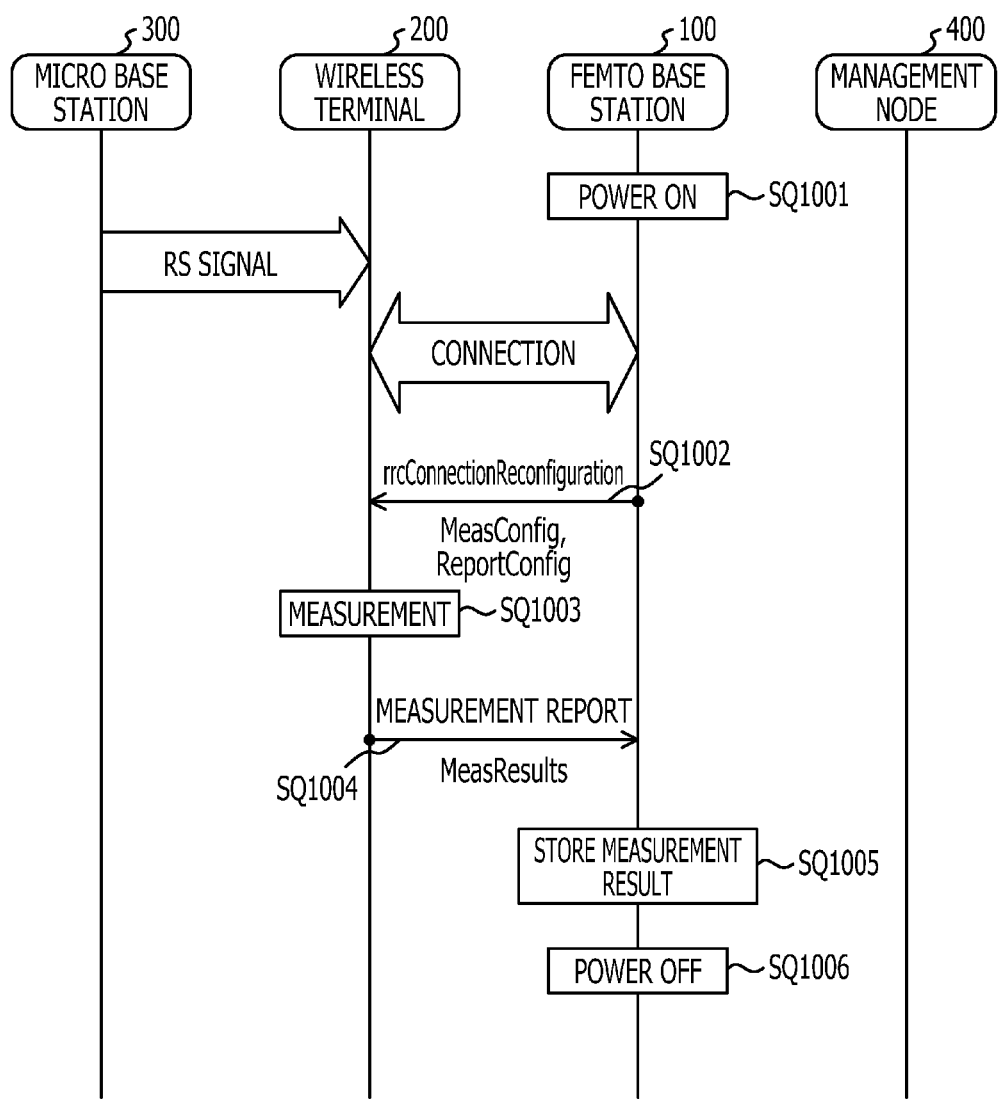
FIG. 9 is a sequence diagram illustrating an operation sequence of an embodiment.
Figure 10:
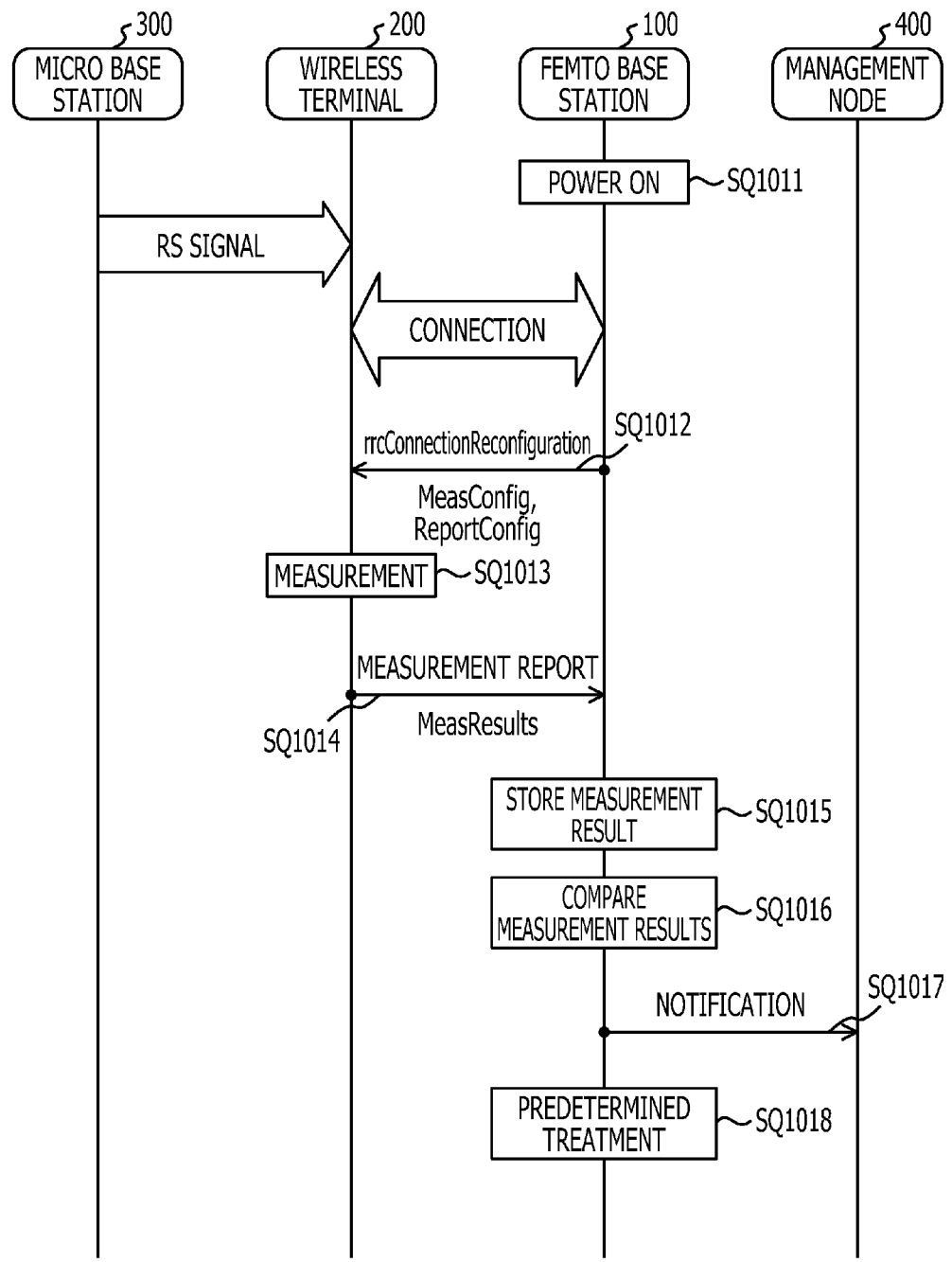
FIG. 10 is a sequence diagram illustrating an operation sequence of an embodiment.

FIGS. 9 and 10 are diagrams illustrating an operation sequence of this embodiment. The example illustrated in FIGS. 9 and 10 is a sequence of operations performed by the femto base station 100, the wireless terminal 200, the macro base station 300, and the management node 400. As with the case of FIG. 1, a plurality of wireless terminals 200 and a plurality of macro base stations 300 may be employed.

When the femto base station 100 is turned on (in SQ1001), connection between the femto base station 100 and the wireless terminal 200 is started. When the wireless terminal 200 and the femto base station 100 are connected to each other, the femto base station 100 requests the wireless terminal 200 to transmit a measurement result (measurement report, for example) (in SQ1002). Here, the femto base station 100 may request the wireless terminal 200 to transmit measurement results obtained by a predetermined number of measurements performed every predetermined period of time. The femto base station 100 may request a plurality of wireless terminals 200 to transmit measurement results.

Upon receiving the request for transmitting a measurement result from the femto base station 100, the wireless terminal 200 receives a reference signal (RS signal) from the macro base station 300 and measures reception quality (in SQ1003). Furthermore, the wireless terminal 200 receives a reference signal from the femto base station 100 and measures reception quality.

The wireless terminal 200 transmits the measurement result to the femto base station 100 (in SQ1004). The measurement result includes base station IDs of base stations from which the wireless terminal 200 receives signals and reception quality information (RSRPs, for example) of signals received from the base stations. The wireless terminal 200 may transmit a measurement result every measurement to the femto base station 100. The wireless terminal 200 may collectively transmit measurement results obtained a predetermined number of times to the femto base station 100.

The femto base station 100 stores the measurement result received from the wireless terminal 200 in a memory, a storage device, or the like (in SQ1005).

The operations from SQ1002 to SQ1005 are repeatedly performed every predetermined period of time. Since the operations from SQ1002 to SQ1005 are repeatedly performed, the femto base station 100 may store the latest measurement result.

The femto base station 100 is turned off by a user's operation or the like (in SQ1006). In this case, the femto base station 100 keeps the measurement result which is stored before the power-off.

It is considered that the femto base station 100 is not displaced while in the power-on state. It is possible that the femto base station 100 is displaced while in the power-off state.

When the femto base station 100 is turned on again (in SQ1011), connection between the femto base station 100 and the wireless terminal 200 is started. Operations from SQ1012 to SQ1015 are the same as the operations from SQ1002 to SQ1005.

The femto base station 100 compares the registered measurement result which has been registered before the power-on (the measurement result store in SQ1005) with the registered measurement result which is registered this time (the measurement result stored in SQ1015) (in SQ1016). When selecting "displaced" or "possibly displaced" as a result of the comparison, the femto base station 100 notifies the management node 400 of "displaced" or "possibly displaced" (in SQ1017). When a predetermined treatment has been specified for a result of the selection, the femto base station 100 executes the predetermined treatment (in SQ1018).

Concrete Example

A concrete example will be described with reference to FIG. 1. As illustrated in FIG. 1, it is assumed that the femto base station 100 is displaced from the position corresponding to the femto base station 100A in the house 402 to the position corresponding to the femto base station 100B of the house 404. Here, the wireless terminal 202 is included in the femtocell of the femto base station 100A and the wireless terminal 204 is included in the femtocell of the femto base station 100B. That is, the wireless terminal 202 may communicate with the femto base station 100A whereas the wireless terminal 204 may communicate with the femto base station 100B.

When the femto base station 100A is turned on in the house 402, the femto base station 100A communicates with the wireless terminal 202. The femto base station 100A requests the wireless terminal 202 to transmit a measurement result. The wireless terminal 202 receives reference signals from the macro base stations 302 and 304 and the femto base station 100A and measures reception quality of the signals. The wireless terminal 202 transmits base station IDs of the macro base stations 302 and 304 and the femto base station 100A and reception quality information corresponding to the macro base stations 302 and 304 and the femto base station 100A to the femto base station 100 as a measurement result. The femto base station 100 stores the received measurement result.

Here, it is assumed that the femto base station 100 is displaced from the position of the femto base station 100A in the house 402 to the position of the femto base station 100B in the house 404 by a user or the like. When the displacement is performed, the femto base station 100 is turned off.

When the femto base station 100B is turned on again in the house 404, the femto base station 100B communicates with the wireless terminal 204. The wireless terminal 204 may be the same as the wireless terminal 202 or may be different from the wireless terminal 202. The femto base station 100B requests the wireless terminal 204 to transmit a measurement result. The wireless terminal 204 receives reference signals from the macro base stations 304 and 306 and the femto base station 100B and measures reception quality of the signals. The wireless terminal 204 transmits base station IDs of the macro base stations 304 and 306 and the femto base station 100B and reception quality information corresponding to the macro base stations 304 and 306 and the femto base station 100B to the femto base station 100 as a measurement result. The femto base station 100 stores the received measurement result.

The femto base station 100 compares the measurement result received before the power-on (the measurement result received in the position of the femto base station 100A) with the measurement result received after the power-on (the measurement result received in the position of the femto base station 100B). Here, it is assumed that the femto base station 100 performs the comparison in accordance with the operation flow illustrated in FIG. 7. The measurement result obtained before the power-on includes the base station IDs of the macro base stations 302 and 304. The measurement result obtained after the power-on includes the base station IDs of the macro base stations 304 and 306. The base station ID of the macro base station 304 is included in both of a previous base station ID group and a current base station ID group. Furthermore, the base station ID of the macro base station 306 is not included in the previous base station ID group but is included in the current base station ID group. Therefore, the femto base station 100 selects "possibly displaced".

Effects of Embodiment

The femto base station 100 requests the wireless terminal 200 connected to the femto base station 100 to transmit a measurement result. The measurement result includes information on base stations near the wireless terminal 200. The femto base station 100 determines whether the femto base station 100 has been displaced by comparing a previous measurement result with the latest measurement result.

The femto base station 100 may detect the displacement of the femto base station 100 without receiving a signal from the macro base station 300. Furthermore, the femto base station 100 may detect the displacement of the femto base station 100 without using a GPS. The femto base station 100 may detect whether the femto base station 100 is displaced using the wireless terminal 200.

The femto base station 100 may request the wireless terminal 200 to transmit a measurement result using a function generally included in the wireless terminal 200. Specifically, the femto base station 100 of this embodiment may be realized without changing the configuration of the wireless terminal 200 from a general configuration of the wireless terminal 200.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A wireless base station comprising:
a storage unit; and
a processor to
transmit to a first wireless terminal a first request for transmitting a first response including first identifiers used to identify first base stations, the first wireless terminal being capable of receiving a signal from each of the first base stations before transmitting the first response,
receive the first response from the first wireless terminal,
store the first response in the storage unit,
transmit to a second wireless terminal a second request for transmitting a second response including second identifiers used to identify second base stations, the second wireless terminal being capable of receiving a signal from each of the second base stations before transmitting the second response, receive the second response from the second wireless terminal, and determine whether the wireless base station has been displaced based on the first identifiers and the second identifiers.

2. The wireless base station according to claim 1, wherein
the first response includes first reception quality information representing reception quality of the signal received from each of the first base stations,
the second response includes second reception quality information representing reception quality of the signal received from each of the second base stations, and
the processor determines whether the wireless base station has been displaced based on the first identifiers, the first reception quality information, the second identifiers, and the second reception quality information.

3. A displacement detection method comprising:
transmitting to a first wireless terminal a first request for transmitting a first response including first identifiers used to identify first base stations, the first wireless terminal being capable of receiving a signal from each of the first base stations before transmitting the first response;
receiving the first response from the first wireless terminal;
storing the first response in a storage unit;
transmitting to a second wireless terminal a second request for transmitting a second response including second identifiers used to identify second base stations, the second wireless terminal being capable of receiving a signal from each of the second base stations before transmitting the second response; receiving the second response from the second wireless terminal; and determining, by a wireless base station, whether the wireless base station has been displaced based on the first identifiers and the second identifiers.

4. The displacement detection method according to claim 3, wherein
the first response includes first reception quality information representing reception quality of the signal received from each of the first base stations,
the second response includes second reception quality information representing reception quality of the signal received from each of the second base stations, and
the wireless base station determines whether the wireless base station has been displaced based on the first identifiers, the first reception quality information, the second identifiers, and the second reception quality information.

* * * * *